(12) United States Patent
Hicks

(10) Patent No.: US 6,856,239 B1
(45) Date of Patent: Feb. 15, 2005

(54) VEHICLE PROXIMITY DOOR OPENER

(75) Inventor: Thomas S. Hicks, Livonia, MI (US)

(73) Assignee: Lear Corporation, Southfield, MI (US)

( * ) Notice: Subject to any disclaimer, the term of this patent is extended or adjusted under 35 U.S.C. 154(b) by 288 days.

(21) Appl. No.: 10/298,884

(22) Filed: Nov. 18, 2002

(51) Int. Cl.⁷ ............................................. B06R 25/00
(52) U.S. Cl. ................ 340/5.7; 340/425.5; 340/825.72; 49/832; 296/155; 318/286
(58) Field of Search ...................... 340/825.72, 825.69, 340/435, 426, 5.7, 425.5; 49/25, 360, 28, 32, 214, 139, 213; 296/155, 146.4; 307/10.1, 10.2; 70/256; 180/289; 292/144; 318/286, 280, 282

(56) References Cited

U.S. PATENT DOCUMENTS

| | | | |
|---|---|---|---|
| 4,121,382 A | 10/1978 | Dietrich et al. | |
| 4,644,693 A | 2/1987 | Wang | |
| 5,319,364 A | 6/1994 | Waraksa et al. | |
| 5,369,911 A | 12/1994 | Fortunato | |
| 5,531,498 A | 7/1996 | Kowall | |
| 5,532,521 A | 7/1996 | Leininger | |
| 5,929,769 A | 7/1999 | Garnault | |
| 5,982,126 A | 11/1999 | Hellinga et al. | |
| 6,075,460 A | 6/2000 | Minissale et al. | |
| 6,293,050 B1 | 9/2001 | Jöhnk | |
| 2001/0054952 A1 | 12/2001 | Desai et al. | |

Primary Examiner—Michael Horabik
Assistant Examiner—M Shimizu
(74) Attorney, Agent, or Firm—Bill C. Panagos

(57) ABSTRACT

In a vehicle having a door, the door having a closed position, a partially open position, and a fully open position, a system for proximity opening of the door includes a remote transmitter, a controller, an actuator, and a switch. The remote transmitter may be for transmitting a wireless first vehicle access signal. The controller may be for receiving the wireless first vehicle access signal and generating a control signal in response thereto. The actuator may be in communication with the controller, the actuator operative to move the door from the closed position to the partially open position in response to the control signal. The switch may be on the door, the switch exposed by movement of the door from the closed position to the partially open position and configured to present a second vehicle access signal when manually activated, the second vehicle access signal for use in moving the door from the partially open position to the fully open position.

20 Claims, 1 Drawing Sheet

VEHICLE PROXIMITY DOOR OPENER

BACKGROUND OF THE INVENTION

1. Field of the Invention

The present invention relates to door openers, generally, and more particularly, to vehicle proximity door openers.

2. Background Art

One conventional method of entry to vehicles via a door is by manually (or electronically with a remote control such as a key fob) unlocking a door lock mechanism, manually operating a door handle and latch mechanism, and then opening the door to gain access to the vehicle. Similarly, conventional exit from vehicles is via manually operating a manual door handle and latch mechanism and then opening the door to leave the vehicle, followed by manual (or electronic) door lock mechanism locking.

Conventional vehicle passive entry/passive exit systems only improve upon the manual systems by providing electronically controlled, hands-free unlocking and locking of the door lock. Manual operation of the door handle and latch mechanisms followed by opening the door is still required to gain entry to and exit from the vehicle.

Conventional manual door handle and latch mechanisms can have significant cost and weight, provide thieves an access path to the vehicle, squeak and rattle, require adjustment and maintenance, and be cumbersome or difficult to operate under some conditions such as when wearing thick gloves or mittens, carrying packages, etc. Furthermore, manual door handles can present styling challenges for vehicle interior and exterior designs and aerodynamic drag on the vehicle exterior.

Thus, there exists a need for a vehicle proximity door opener system that eliminates the conventional exterior and interior manual door opening mechanisms. Such an improvement would thereby reduce vehicle cost and weight, and improve vehicle security and customer convenience when compared to conventional door opening systems.

SUMMARY OF THE INVENTION

Accordingly, the present invention provides an improved system and method for a vehicle proximity door opener that eliminates the conventional exterior and interior manual door opening mechanisms. A transmitter passively transmits a wireless vehicle access control signal and an openable member (e.g., a door) of the vehicle that is generally closed at a primary latched position opens to a secondary latched (partially open) position in response to the wireless access control signal. The door generally exposes a switch and a handle when opened to the partially open position. The switch generally presents a second vehicle access control signal when actuated. The door is generally fully openable in response to the second vehicle access control signal or actuation of the handle. The present invention may eliminate conventional exterior and interior manual door opening mechanisms and, thereby, reduce vehicle cost and weight, and improve vehicle security and customer convenience when compared to conventional door opening systems.

According to the present invention, in a vehicle having a door, the door having a closed position, a partially open position, and a fully open position, a system for proximity opening of the door is provided comprising a remote transmitter, a controller, an actuator, and a switch. The remote transmitter may be for transmitting a wireless first vehicle access signal. The controller may be for receiving the wireless first vehicle access signal and generating a control signal in response thereto. The actuator may be in communication with the controller, the actuator operative to move the door from the closed position to the partially open position in response to the control signal. The switch may be on the door, the switch exposed by movement of the door from the closed position to the partially open position and configured to present a second vehicle access signal when manually activated, the second vehicle access signal for use in moving the door from the partially open position to the fully open position.

Also according to the present invention, in a vehicle having a door, the door having a closed position, a partially open position, and a fully open position, a method for proximity opening of the door is provided comprising receiving a remote wireless first vehicle access signal, generating a control signal in response to the wireless first vehicle access signal, moving the door from the closed position to the partially open position in response to the control signal, and generating a second vehicle access signal in response to manual activation of a switch on the door exposed by movement of the door from the closed position to the partially open position, the second vehicle access signal for use in moving the door from the partially open position to the fully open position.

The above features, and other features and advantages of the present invention are readily apparent from the following detailed descriptions thereof when taken in connection with the accompanying drawings.

DETAILED DESCRIPTION OF THE PREFERRED EMBODIMENT(S)

With reference to the Figures, the preferred embodiments of the present invention will now be described in detail. Generally, the present invention provides a vehicle proximity door opener system that eliminates conventional manual door handle and latch opening mechanisms. The present invention may thereby reduce vehicle cost and weight, and improve vehicle security and customer convenience when compared to conventional door opening systems.

Figure 1A:
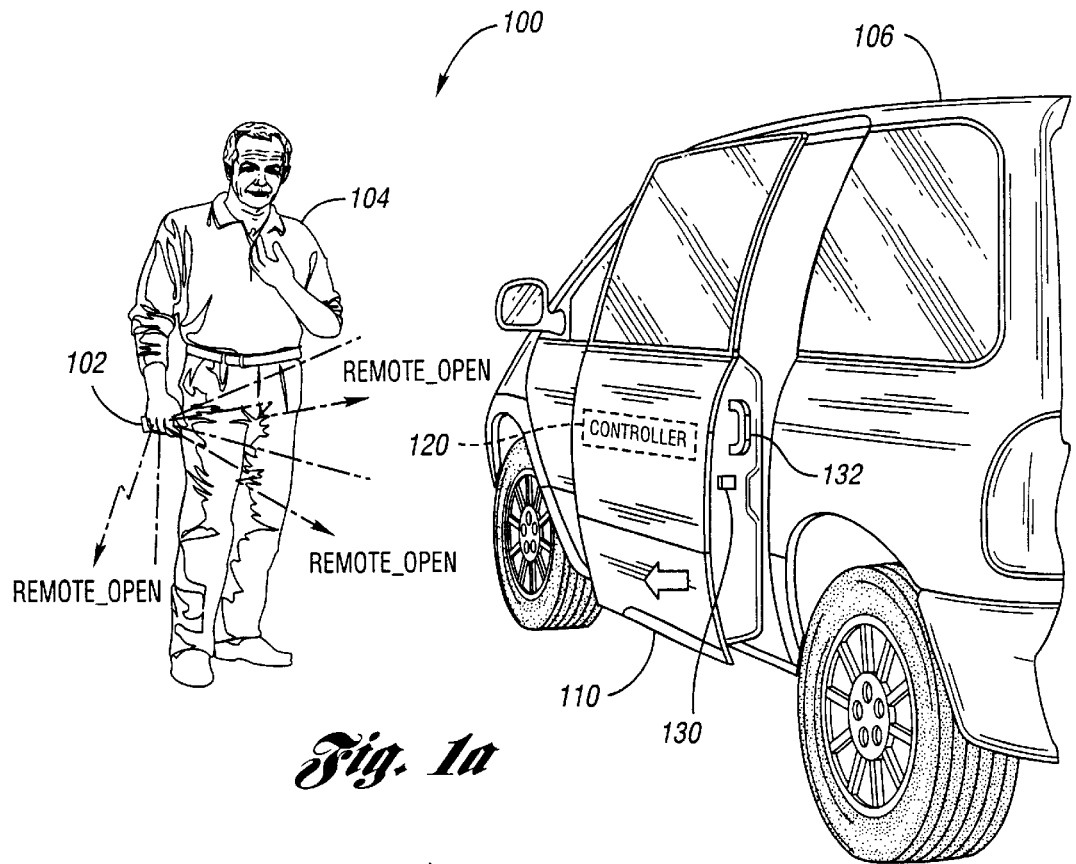
FIGS. 1(a–b) are diagrams illustrating a vehicle door opener system in accordance with a preferred embodiment of the present invention.
Figure 1B:
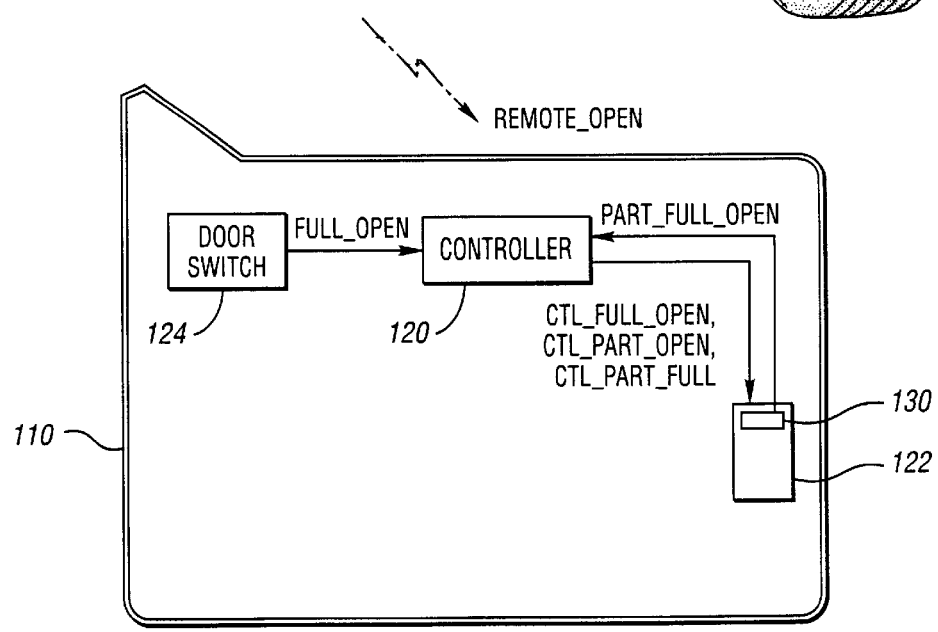

Referring to FIGS. 1(a–b), diagrams illustrating a proximity door opener system 100 in accordance with the present invention are shown. The system 100 is generally implemented in connection with a vehicle application. The system 100 generally comprises a transmitter 102 carried by a user 104 and a vehicle 106.

The transmitter 102 may be implemented as a key fob, a "smart card", a key head, or any appropriate vehicle access device to meet the design criteria of a particular application. The transmitter 102 generally comprises a proximity chip that may be configured to present (i.e., transmit, broadcast, etc.) a signal (e.g., REMOTE_OPEN). The signal REMOTE_OPEN may be implemented as a wireless vehicle access control signal. The signal REMOTE_OPEN is generally transmitted passively (i.e., without manual actuation by the user 104). However, the access device 102 may be configured to transmit the signal REMOTE_OPEN in response to an active operation (e.g., pushing a button, actuating a switch, etc.) by the user 104 as well as passively.

The signal REMOTE_OPEN generally controls a mode of operation (i.e., a mode of opening) of at least one openable member (or door) of the vehicle 106. The signal REMOTE_OPEN generally controls partial (e.g., approximately 100 mm) opening of the at least one door of the vehicle 106 via an opening apparatus (not shown) when the user 104 approaches the vehicle 106 and reaches a proximity of the door. The signal REMOTE_OPEN is generally implemented as an encrypted and/or authenticated signal.

The vehicle 106 is generally an automotive product (e.g., car, truck, sport utility vehicle, van, mini-van, multi-purpose vehicle, etc.). The vehicle 106 generally comprises at least one openable member (i.e., door, hatch, port, etc.) 110. The door 110 generally comprises a controller (or proximity module) 120, a door opener actuator 122, and a switch 124. The door 110 is generally attached to the vehicle 106 by at least one hinge (not shown) and generally swings between closed, partially open, and fully opened positions. The door 110 is generally at a primary latched position when fully closed. The door 110 is generally opened to a secondary latched (partially open) position in response to the signal REMOTE_OPEN.

The controller 120 may have inputs that may receive the signal REMOTE_OPEN, a signal (e.g., PART_FULL_OPEN) and a signal (e.g., FULL_OPEN) and outputs that may present signals (e.g., CTL_PART_OPEN, CTL_PART_FULL and CTL_FULL_OPEN). The signals PART_FULL_OPEN and FULL_OPEN may be implemented as control signals. The signals PART_FULL_OPEN and FULL_OPEN generally control modes of operation (i.e., partially open to fully open and fully or completely openable modes, respectively) of the door 110. The door 110 may be fully (or completely) openable (i.e., the primary and secondary latched positions may be overcome) in response to the signal FULL_OPEN. The signals CTL_PART_OPEN, CTL_PART_FULL and CTL_FULL_OPEN may be generated as actuator control signals that control closed to partially open, partially open to fully open, and closed to fully or completely open modes of the door 110 in response to the signals REMOTE_OPEN, PART_FULL_OPEN and FULL_OPEN, respectively.

The actuator 122 generally comprises a door motion (opening) control apparatus (not shown), an electromechanical switch 130 and a mechanical handle 132. The actuator 122 is generally coupled to the controller 120 and receives the signals CTL_PART_OPEN, CTL_PART_FULL and CTL_FULL_OPEN. The switch 130 generally presents the signal PART_FULL_OPEN in response to actuation (e.g., push, pull, flick, etc.) by the user 104. The door 110 may also be fully (or completely) openable from the partially open position in response to manual actuation (i.e., operation) of the handle 132. The switch 130 and the handle 132 are generally positioned on the door 110 in locations that are inaccessible (e.g., hidden, protected, not exposed, etc.) when the door 110 is in the fully closed (i.e., primary latched) position and are exposed (or accessible) when the door 110 is in the partially open (i.e., secondary latched) position or the completely open position.

The actuator 122 may be configured to control the door 110 (e.g., the openability) in the primary and secondary latched positions. The actuator 122 is generally operative to move the door 110 from the closed position to the partially open position in response to the signal CTL_PART_OPEN, the partially open position to the fully open position in response to the signal CTL_PART_FULL, and the closed position to the fully open position in response to the signal CTL_FULL_OPEN.

The switch 124 generally comprises an electromechanical switch. The switch 124 is generally positioned (or disposed) interior to the vehicle 106 on or near a surface of the door 110. The switch 124 is generally accessible to the user 104 when the user 104 is inside the vehicle 106. The switch 124 generally presents the signal FULL_OPEN (and the door 110 is completely openable) in response to actuation of the switch 124 by the user 104. The user 104 generally actuates the switch 124 (and opens the door 110) to overcome the primary and secondary latched positions of the door 110 (via the actuator 122) and allow exit from the vehicle 106. The vehicle 106 may be configured such that the switch 124 is inactive when the vehicle 106 is in motion to reduce or prevent inadvertent opening of the door 110.

To gain entry to the vehicle 106 when the door 110 is fully closed, the user 104 generally carries the transmitter 102 and approaches the vehicle 106 while the device 102 is transmitting the signal REMOTE OPEN. When the user 104 is in the proximity of the vehicle 106, the controller 120 receives the signal REMOTE_OPEN and presents the signal CTL_PART_OPEN to the door opener actuator 122. The actuator 122 (and the corresponding opening apparatus) may control opening the door 110 to the partially open (e.g., open to approximately 100 mm) position and, thereby, provide the user 104 access to the switch 130 and the handle 132.

In one example (a vehicle side entry/exit door), the door 110 is generally hinged at an edge that is towards the front of the vehicle 106 and the door 110 opens (partially and completely) at an edge that is towards the rear of the vehicle 106. When the door 110 is at the partially open position, the switch 130 and the handle 132 are generally exposed at the edge that is towards the rear of the vehicle 106.

In another example (a vehicle hatch), the hatch 110 is generally hinged at an edge that is towards the top of the vehicle 106 and the hatch 110 opens (partially and completely) at an edge that is towards the bottom of the vehicle 106. When the hatch 110 is at the partially open position, the switch 130 and the handle 132 are generally exposed at the edge that is towards the bottom of the vehicle 106 or on a vehicle surface near the edge that is towards the bottom of the vehicle 106. However, the partially open position of the door or hatch 110 may be configured to expose the switch 130 and the handle 132 at any appropriate location to meet the design criteria of a particular application.

When the door 110 is at the partially open (i.e., the secondary latched) position, the user 104 may actuate either the switch 130 (and, thereby, assert the signal PART_FULL_OPEN) or the handle 132 to fully open the member 110 and, thereby, gain entry to the vehicle 106. When the door 110 is at the partially open position, the opening mechanism actuator 122 is generally at the secondary latched position such that the door 110 does not open further without further actuation (e.g., actuation of either the switch 130 or the handle 132). Actuation of the switch 124 interior to the vehicle 106 (and, thereby, assertion of the signal FULL_OPEN) generally overcomes the primary and the secondary latched positions such that the door 110 is fully openable.

The proximity to the vehicle 106 at which the signal REMOTE_OPEN transmitted by the device 102 is received by the controller 120 and presented to the actuator 122 is generally in the range of 0.5 to 10 m and preferably in the range of 1 to 3 m. However, the proximity at which the signal REMOTE_OPEN is received by the controller 120 may be implemented at any appropriate range to meet the design criteria of a particular application.

While the system 100 of the present invention has been described in connection with at least one door or hatch 110 and the respective signals REMOTE_OPEN and FULL_OPEN, the system 100 may be implemented having a plurality (i.e., any appropriate number) of doors 110 (e.g., doors 110a–110n, not shown) to meet the design criteria of a particular application. When the system 100 is implemented having more than one door 110 (i.e., doors 110a–110n), the system 100 is generally implemented having more than one transmitter 102 (e.g., a plurality of transmitters 102a–102n), a plurality of respective switches 124a–124n, a plurality of respective switches 130a–130n and handles 132a–132n, and/or respective control signals REMOTE_OPEN, PART_FULL_OPEN and FULL_OPEN (e.g., signals REMOTE_OPENa–REMOTE_OPENn, PART_FULL_OPENa–PART_FULL_OPENn and FULL_OPENa–FULL_OPENn). The transmitters 102a–102n, the switches 124a–124n, the switches 130a–130n, the handles 132a–132n, and the control signals REMOTE_OPENa–REMOTE_OPENn, PART_FULL_OPENa–PART_FULL_OPENn, and FULL_OPENa–FULL_OPENn are each generally configured to control the respective door 110a–110n.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. In a vehicle having a door, the door having a closed position, a partially open position, and a fully open position, a system for proximity opening of the door comprising:
   a remote transmitter for transmitting a wireless first vehicle access signal;
   a controller for receiving the wireless first vehicle access signal and generating a control signal in response thereto;
   an actuator in communication with the controller, the actuator operative to move the door from the closed position to the partially open position in response to the control signal; and
   a switch on the door, the switch exposed by movement of the door from the closed position to the partially open position and configured to present a second vehicle access signal when manually activated, the second vehicle access signal for use in moving the door from the partially open position to the fully open position.

2. The system of claim 1 further comprising a second switch disposed interior to the vehicle and configured to present a third vehicle access signal when manually activated, the third vehicle access signal for use in moving the door from the closed position to the fully open position.

3. The system of claim 1 wherein the switch is provided in communication with the controller, the controller generates a second control signal in response to the second vehicle access signal, and the actuator is operative to move the door from the partially open position to the fully open position in response to the second control signal.

4. The system of claim 2 wherein the second switch is provided in communication with the controller, the controller generates a third control signal in response to the third vehicle access signal, and the actuator is operative to move the door from the closed position to the fully open position in response to the third control signal.

5. The system of claim 1 wherein the door includes a handle exposed by movement of the door from the closed position to the partially open position, the handle for use in manually moving the door from the partially open position to the fully open position.

6. The system of claim 1 wherein the door is attached to the vehicle by a hinge and swings between the closed, partially open, and fully open positions.

7. The system of claim 1 wherein the closed position comprises a primary latched position.

8. The system of claim 1 wherein the partially open position comprises a secondary latched position.

9. The system of claim 1 wherein the transmitter passively transmits the wireless first vehicle access signal.

10. The system of claim 1 wherein the transmitter transmits the wireless first vehicle access signal in response to manual activation.

11. In a vehicle having a door, the door having a closed position, a partially open, position, and a fully open position, a method for proximity opening of the door comprising:
    receiving a remote wireless first vehicle access signal;
    generating a control signal in response to the wireless first vehicle access signal;
    moving the door from the closed position to the partially open position in response to the control signal; and
    generating a second vehicle access signal in response to manual activation of a switch on the door exposed by movement of the door from the closed position to the partially open position, the second vehicle access signal for use in moving the door from the partially open position to the fully open position.

12. The method of claim 11 further comprising generating a third vehicle access signal in response to manual activation of a second switch disposed interior to the vehicle, the third vehicle access signal for use in moving the door from the closed position to the fully open position.

13. The method of claim 11 wherein the switch is provided in communication with a controller, the controller generates a second control signal in response to the second vehicle access signal, and an actuator in communication with the controller is operative to move the door from the partially open position to the fully open position in response to the second control signal.

14. The method of claim 12 wherein the second switch is provided in communication with a controller, the controller generates a third control signal in response to the third vehicle access signal, and an actuator in communication with the controller is operative to move the door from the closed position to the fully open position in response to the third control signal.

15. The method of claim 11 wherein the door includes a handle exposed by movement of the door from the closed position to the partially open position, the handle for use in manually moving the door from the partially open position to the fully open position.

16. The method of claim 11 wherein the door is attached to the vehicle by a hinge and swings between the closed, partially open, and fully open positions.

17. The method of claim 11 wherein the closed position comprises a primary latched position.

18. The method of claim 11 wherein the partially open position comprises a secondary latched position.

19. The method of claim 11 wherein the remote wireless first vehicle access signal is transmitted passively.

20. The method of claim 11 wherein the remote wireless first vehicle access signal is transmitted actively.

* * * * *